UNITED STATES PATENT OFFICE.

GEORGE HAND SMITH, OF LONDON, ENGLAND; ARTHUR J. BENEDICT ADMINISTRATOR OF SAID SMITH, DECEASED.

METHOD OF MAKING VARNISH.

SPECIFICATION forming part of Letters Patent No. 496,451, dated May 2, 1893.

Application filed June 23, 1891. Serial No. 397,919. (No specimens.) Patented in England April 23, 1891, No. 7,036; in France January 26, 1892, No. 218,956; in Belgium January 28, 1892, No. 98,130, and in Canada April 20, 1892, No. 38,757.

*To all whom it may concern:*

Be it known that I, GEORGE HAND SMITH, doctor of medicine, a citizen of the United States of America, residing at Rochester, New York, and temporarily residing at London, in the county of Middlesex, England, have invented certain new and useful Improvements in the Treatment of Gums and the Preparation of Varnishes Therefrom, (patented in England, No. 7,036, April 23, 1891; in France, No. 218,956, January 26, 1892; in Belgium, No. 98,130, January 28, 1892, and in Canada, No. 38,757, April 20, 1892,) of which the following is a specification.

This invention has for its object the treatment of gums in order to obtain varnishes therefrom without employing fusion of those gums previous to their solution in the solvent medium.

In carrying out my invention I design to utilize the property which I have discovered by experiment, that resins or the more easily solved gums, are in different or relative, degrees available for use, as solvents or aids to solution of harder or more refractory gums; or one class of gum is used as an aid in solution of another class or description of gum in the presence of a suitable solvent medium such as linseed oil or other oil, capable of holding the gums (including gum resins) in solution or combination while conducting the operation at low degrees of temperature, that is to say at temperatures sufficiently low not to cause discoloration, or loss of weight to the gums to any serious extent in the resultant production. For instance, this combination or reduction of gums may be effected at a temperature as low as (say) about 250° Fahrenheit to commence with, raising the temperature as the operation proceeds. As instances of soft gums, or resins I may employ kauri, manila, dammar and ordinary commercial resins of ready solubility. The harder gums or gum resins, anime, amber, or other like gums cannot be employed. Supposing kauri gum to be desired to be reduced to solution for use in making a varnish, a small quantity of some resin, such as fine resin so insignificant in quantity relatively to the quantity of hard gum as not to have any prejudicial effect on the resultant varnish, is dissolved in linseed oil. This solution is then added in a suitable vessel to a quantity of kauri gum and the desired quantity of linseed oil suitable for forming the solution of the gum is added, and upon sufficient heat, say about 300° to 450° Fahrenheit being applied, solution will be found to be induced by the presence of the first mentioned solution. In ordinary cases I prefer to use open vessels for treating the gums in, on account of their convenience, but if found desirable, closed vessels may be employed together with pressure.

I claim—

1. The herein described method of making varnish, which consists in dissolving by the aid of heat a resin in a suitable oil, and treating a gum with a small quantity of this solution together with a suitable quantity of oil, substantially as described.

2. The herein described method of making varnish, which consists in dissolving by the aid of heat a resin in linseed oil, and treating a gum with a small quantity of the solution together with a suitable quantity of oil, substantially as described.

3. The herein described method of making varnishes, which consists in dissolving by the aid of heat, resin in a suitable oil, and treating a gum with a small quantity of the solution together with a suitable quantity of oil, substantially as described.

4. The herein described method of making varnishes, which consists in dissolving resin by the aid of heat, in linseed oil and treating a gum with a small quantity of the solution, together with a suitable quantity of oil, substantially as described.

In testimony whereof I, the said GEORGE HAND SMITH, have hereunto set my hand this 10th day of June, 1891.

GEORGE HAND SMITH.

Witnesses:
ALFRED GEORGE BROOKES,
JOHN GOODYEARS.